UNITED STATES PATENT OFFICE 2,607,761

REACTION PRODUCTS OF ALKYLENE OXIDES AND SYNTHETIC POLYMERIC CARBOXYLIC ACIDS

Raymond B. Seymour, Chattanooga, Tenn., assignor to Industrial Research Institute of the University of Chattanooga, Chattanooga, Tenn., a corporation of Tennessee No Drawing. Application April 10, 1948, Serial No. 20,366

12 Claims. (Cl. 260—78.5)

This invention relates to the production of reaction products of alkylene oxides and synthetic polymeric carboxylic acids.

Representative alkylene oxides or epoxy compounds with which the invention is concerned are, ethylene oxide, propylene oxide, epoxybutane, epoxybutene, epichlorohydrin, and phenylethylene oxide.

The synthetic polymeric carboxylic acids to be reacted with the alkylene oxide, may be selected from the following groups:

(1) Hydrolized copolymers of maleic anhydride and vinyl and substituted vinyl compounds. Examples of such compounds are alkyl or aryl acrylates or methacrylates, such as methyl acrylate and methyl methacrylate, styrene, vinyl acetate, α-methylstyrene, methyl isopropenyl ketone, vinyl isopropyl ether, vinyl ethyl hexyl ether, cyclohexyl methacrylate, and isobutyl acrylate. The copolymers may be produced, for example, according to the teaching of Patent 2,047,398.

(2) Polymers and copolymers of acrylic, methacrylic, crotonic, cinnamic, α-chloroacrylic and sorbic acids. The copolymers of these acids may be with the vinyl and substituted vinyl compounds mentioned above. These polymers and copolymers may be formed, for example, in accordance with the disclosure of Patents 2,369,520, 2,244,702, 2,244,703, 2,117,321, 2,189,734, 2,373,488 and 2,399,684.

As the reaction products of the present invention have many important uses, as will be mentioned, a foremost advantage of the invention resides in the fact that the process is carried out readily at room temperature and without the use of autoclaves. Although reactions of ethylene oxide with active hydrogen atoms are known, these reactions have been hazardous, difficult and expensive to bring about as they have usually involved high temperatures and pressures.

It is accordingly a primary object of the present invention to react alkylene oxides with synthetic polymeric carboxylic acids under conditions which involve ordinary pressures and temperatures, and inexpensive apparatus and ingredients.

The products differ from the starting materials and are useful as humectants, water soluble sizes, lubricants, tanning agents, components of printing pastes, bonding agents for textile fibers, detergents, oil well drilling fluids, paint components, mold release agents, thickening agents, components for natural and synthetic latices, blending agents for starch, emulsifying agents, protective colloids, coatings, fibers, adhesives, wire drawing assistants, cutting fluids and as additives to viscose spinning baths.

In practicing the invention, the synthetic polymeric carboxylic acid to be reacted with the alkylene oxide is first dissolved in an aqueous alkali solution. This preferably is a dilute solution of ammonium, sodium or potassium hydroxide, and may have a concentration of ¼ to 5% by weight. A 1% aqueous solution of sodium hydroxide has been found to be an excellent solvent for this purpose. Not only does the alkaline solution serve to better dissolve the acid, but it apparently has an important catalytic effect as well, as will appear from the examples.

The synthetic polymeric carboxylic acid is dissolved in this alkali. A 100 gram mixture may contain from about 1 gram up to saturation of the polymeric acid. Best results are obtained with a concentration within the range of 2–10%, a 5% concentration being preferred.

To this solution of the polymeric acid in the alkali, is added alkylene oxide so that it constitutes from 1 to 50% by weight of the mixture. A preferred concentration is from 2–10%, a 5% concentration being optimum. To insure completion of the reaction, it is desirable that there be an excess of the alkylene oxide, on a molar basis, as even a considerable excess of the alkylene oxide does not adversely affect the reaction.

The reaction is preferably allowed to proceed at room temperature, until no further material change in the pH occurs, this indicating that the reaction is completed. This may require from 2 to 15 days, depending upon the ingredients and their concentrations. Thus, an increase in the alkali from a 1% concentration to a 4% concentration will reduce the reaction time to about ⅕. Also, an increase in the reaction temperature will increase the rate of the reaction, but this may be undesirable in many instances because a closed vessel will be required to prevent loss of the alkylene oxide. Agitation during the reaction period is not necessary.

That a reaction takes place between the alkylene oxide and the synthetic polymeric carboxylic acid is evident from the fact that in all instances there is an increase in the pH of the system. This is believed to be indicative of the fact that there is an addition to the carboxylic acid groups to form hydroxy ethyl esters. There is ample evidence of the fact, as will appear from the examples, that the type of reaction taking place is not due to the formation of polymers of the alkylene oxide which in turn condense with the synthetic polymeric carboxylic acid.

This effect of the epoxy compound on the pH of the polymeric acid solution is brought out in Table I. This shows the effect of ethylene oxide on the pH of aqueous solutions of copolymers of maleic anhydride and the stated vinyl compound.

TABLE I

| Copolymer of Maleic Anhydride with: | Molar Ratio | | | Temperature (°C.) | pH, Time (hrs.) | | | | | | | | |
|---|---|---|---|---|---|---|---|---|---|---|---|---|---|
| | Alkali | Ethylene Oxide: Copolymer | Alkali: Copolymer | | 0 | 16 | 31 | 43 | 66 | 90 | 143 | 193 | 264 |
| 1 Styrene | NaOH | 1 | 1 | 25 | 5.4 | 5.8 | 6.1 | 6.3 | 7.3 | 7.7 | 8.1 | 8.4 | 9.1 |
| 2 Styrene | NaOH | 2 | 1 | 25 | 5.4 | 6.6 | 7.1 | 7.9 | 8.3 | 10.6 | 12.2 | 12.4 | 12.4 |
| 3 Styrene | NaOH | 2 | 1.3 Ca. | 25 | 7.0 | | | | | 9.5 | | | |
| 4 Styrene | NaOH | 2 | 2 Ca. | 25 | 11.5 | | | | | 11.8 | | | |
| 5 Styrene | NaOH | 2 | 4 Ca. | 25 | 11.5 | | | | | 11.7 | | | |
| 6 Styrene | NaOH | 2 | 0.5 Ca. | 25 | 5.0 | | | | | 5.7 | | | |
| 7 Styrene | NH₃ | 1 | 1 Ca. | 25 | 4.0 | 4.3 | 4.3 | 4.5 | 4.8 | 5.0 | 5.1 | 5.2 | 5.2 |
| 8 Styrene | NH₃ | 2 | 1 | 25 | 4.0 | 4.3 | 4.7 | 4.8 | 5.6 | 5.6 | 5.9 | 6.5 | 7.4 |
| 9 α-methyl-styrene | NaOH | 2 | 2 | 25 | 11.3 | 12.7 | 12.8 | 13.0 | 13.0 | | | | |
| 10 Vinyl Acetate | NaOH | 2 | 1 | 25 | 4.1 | 4.5 | 4.9 | 5.2 | 5.4 | 5.7 | 6.2 | 6.8 | |
| 11 Methyl Methacrylate | NaOH | 2 | 1 | 25 | 5.2 | 6.1 | 6.6 | 7.7 | 8.4 | 9.5 | 11.6 | 12.7 | 12.7 |
| 12 Acrylic Acid | NaOH | 2 | 0 | 25 | 0.8 | 1.6 | | 2.1 | 2.1 | 2.1 | | | |

Other evidence of the fact that a reaction takes place is that the viscosity of the solution generally decreases, a change in the appearance of the solution occurs as it generally becomes clear, and the product has a greater surface activity. The reaction product also possesses physical and chemical properties different from the initial ingredients, whereby the product has unusual utility for certain purposes, as will appear from the examples.

The effect on the surface tension and viscosity is shown by the following Table II. Surface tension and viscosity data were obtained at 23° C. using a du Nouy tensiometer and a Stormer viscometer equipped with a 50 g. weight.

TABLE II

*Surface tension and viscosity data for ethylene oxide addition products of styrene-maleic anhydride copolymer*

| Molar Ratio, Ethylene Oxide: Copolymer | Viscosity, Stormer (sec.) | Surface Tension | |
|---|---|---|---|
| | | (Dynes/Cm.²) | pH |
| (water) | 8.4 | 72.1 | 6.0 |
| (copolymer) | 157.5 | 49.5 | 5.2 |
| 2 | 15.2 | 45.2 | 11.8 |
| 4 | 15.0 | 45.1 | 11.8 |
| 6 | 15.2 | 44.8 | 11.8 |
| 8 | 14.8 | 44.6 | 11.8 |
| 10 | 15.4 | 44.7 | 11.8 |

The reaction with epoxy compounds appears to be general as is indicated by the pH data for these reactions which is summarized in Table III. These data were obtained by determining the pH at intervals of aqueous solutions containing one mol of the half sodium salt of the copolymer of styrene and maleic anhydride in presence of 2 mols of the epoxy compound at 25° C.

TABLE III

*The effect of epoxy compounds on pH of aqueous solutions of the copolymer of styrene and maleic anhydride*

| Epoxy Compound | pH, time (hrs.) | | | | | | | | |
|---|---|---|---|---|---|---|---|---|---|
| | 0 | 18 | 31 | 43 | 66 | 90 | 143 | 193 | 264 |
| Ethylene Oxide | 5.4 | 6.6 | 7.1 | 7.9 | 8.3 | 10.6 | 12.2 | 12.4 | 12.4 |
| Propylene oxide | 5.4 | 6.3 | 7.0 | 7.3 | 0.7 | 9.6 | 11.7 | 12.3 | |
| 3,4-epoxy-1-butene | 5.4 | 6.1 | 6.8 | 7.2 | | 8.7 | 9.1 | 9.2 | 9.3 |
| Phenylethylene oxide | 5.4 | 5.9 | 6.1 | 6.3 | 6.5 | 6.7 | 7.1 | 7.6 | |
| Epichlorohydrin | 5.4 | 5.5 | 6.1 | | 7.3 | 9.9 | solid | | |

It may be observed that if the reaction of the invention is carried out with the copolymers referred to in the paragraphs (1) and (2) above, the reaction proceeds practically independently of the molar ratio of the ingredients of the copolymer. Thus, equivalent molar copolymers may be used, but as suitable copolymers are obtained by wide departures from this ratio, these copolymers may be used to condense with the alkylene oxide.

The following examples will serve to further bring out the nature of the invention.

EXAMPLE 1

To 10.1 parts styrene-maleic anhydride copolymer dissolved in 200 ml. 1% aqueous sodium hydroxide was added 4.4 parts ethylene oxide and the solution was allowed to stand for six days at room temperature. The reaction proceeded at a steady rate as evidenced by a change in pH from 5.4 to 12.2. At the end of this period, no further change in pH took place. The viscosity decreased as the reaction took place and clear continuous films could be cast from the product. Films from the original material tended to check and crack. Films from the product insolubilized on heating and thus produced a permanent size on textiles. The product had greater surface activity than the starting material, as evidenced by the following data: A 50 g. weight was used in determining the Stormer viscosity.

| | Appearance | Viscosity Stormer (Sec) | Surface Tension Dynes/cm. | pH |
|---|---|---|---|---|
| Original solution | milky | 157.5 | 49.5 | 5.4 |
| Reaction product | clear | 15.2 | 45.2 | 12.2 |

EXAMPLE 2

Example 1 was repeated using 2.2 parts ethylene oxide. The results were:

| | Appearance | Viscosity Stormer (Sec) | Surface Tension Dynes/cm. | pH |
|---|---|---|---|---|
| Original solution | milky | 157.5 | 49.5 | 5.4 |
| Reaction product | clear | 25.6 | 47.1 | 9.1 |

EXAMPLE 3

Example 1 was repeated using 8.8 parts ethylene oxide. The results were:

|  | Appearance | Viscosity Stormer (Sec) | Surface Tension Dynes/cm. | pH |
|---|---|---|---|---|
| Original solution | milky | 157.5 | 49.5 | 5.2 |
| Reaction product | clear | 15.0 | 45.1 | 11.8 |

EXAMPLE 4

Example 1 was repeated using 22.2 parts ethylene oxide. The results were:

|  | Appearance | Viscosity Stormer (Sec) | Surface Tension Dynes/cm. | pH |
|---|---|---|---|---|
| Original solution | milky | 157.5 | 49.5 | 5.2 |
| Reaction product | clear | 15.4 | 44.7 | 11.8 |

EXAMPLE 5

Example 1 was repeated using 89.2 parts ethylene oxide. Essentially the same result was obtained.

EXAMPLE 6

Example 1 was repeated using ammonia in place of sodium hydroxide. The reaction proceeded for twelve days at room temperature. The pH rose from 4.0 to 8.2, showing that the condensation took place with the carboxyl group and not with ammonia under the conditions used.

EXAMPLE 7

Example 1 was repeated using 4% sodium hydroxide solution. The reaction took place at a rapid rate and was complete in less than one day.

EXAMPLE 8

Example 1 was repeated at 60° C. Reaction took place at a more rapid rate but it was necessary to use an autoclave to prevent escape of the ethylene oxide.

EXAMPLE 9

To show that the half ester as well as the polymeric acid per se could be used, 10.1 parts styrene-maleic anhydride copolymer in 100 parts anhydrous methanol in presence of 1 part sodium carbonate was refluxed for 8 hours. The resulting half methyl ester was precipitated in water. The product which separated was dissolved in 200 parts 1% aqueous sodium hydroxide and reacted with ethylene oxide as in Example 1. A reaction took place as evidenced by an increase in pH and a decrease in viscosity.

EXAMPLE 10

Cotton yarn was sized with the product from Example 1. The resulting sized yarn could be tied into a small loop without cracking the size. The original product cracked under this test.

EXAMPLE 11

Pigments were dispersed in the aqueous solution from Example 1 and printed on cloth. The print became insolubilized on heating.

EXAMPLE 12

Example 1 was repeated using 7 parts 3,4-epoxy-1-butene. The pH increased from 5.4 to 9.1 in 6 days. The product was clear and was unsaturated.

EXAMPLE 13

Example 1 was repeated using 5.8 parts propylene oxide. The pH increased from 5.4 to 12.3 in 8 days. The product was clear and of low viscosity.

EXAMPLE 14

Example 1 was repeated using 12.0 parts phenylethylene oxide. The pH increased from 5.4 to 7.6 in 8 days and the viscosity of the solution decreased.

EXAMPLE 15

To 9.2 parts vinyl acetate-maleic anhydride copolymer in 200 parts water was added 4.4 parts ethylene oxide but no change in pH with time was noted and it is questionable if the expected reaction took place under these conditions. However, when the reaction was repeated with the addition of 2 parts sodium hydroxide the pH increased from 4.1 to 8.6 in 15 days and the solution became clear and less viscous.

EXAMPLE 16

The second part of Example 15 was repeated using 22.2 parts ethylene oxide. Viscosity and surface tension decreased and pH increased.

EXAMPLE 17

Example 1 was repeated using 5.4 parts α-methyl-styrene-maleic anhydride copolymer in 200 parts 2% aqueous sodium hydroxide. The pH increased from 11.3 to 13.0 in 2 days and the product was less viscous than the original.

EXAMPLE 18

Example 1 was repeated using 4.95 parts methyl methacrylate-maleic anhydride copolymer in 100 parts 1% aqueous sodium hydroxide. The pH increased from 5.2 to 12.7 in 8 days and the product was less viscous than the original. In this case the equimolar copolymer was used but copolymers having 90, 75 and 60 parts methyl methacrylate with 10, 25 and 40 parts maleic anhydride also condensed with ethylene oxide.

EXAMPLE 19

Example 1 was repeated using 4.25 parts of equimolar acrylic acid-maleic anhydride copolymer in 200 ml. of water. There was an increase in pH of 0.8 to 2.1 in 2 days. When the reaction was repeated in presence of sodium hydroxide the reaction took place more readily to form a product which could be extruded to form flexible monofilaments.

EXAMPLE 20

To 10 parts polymethacrylic acid in 200 parts 1% aqueous sodium hydroxide was added 13.2 parts ethylene oxide, and the solution was allowed to stand 10 days at room temperature. The product was used as a warp size on cotton yarns, since it did not shed and was superior to starch-animal oil compositions.

EXAMPLE 21

To 10 parts of a copolymer of styrene (70), acrylic acid (30), 200 parts 1% aqueous alkali was added 10 g. ethylene oxide and the solution was allowed to stand at room temperature. The pH of the solution increased and the viscosity decreased as in previous examples. Clear films were cast from the product.

EXAMPLE 22

Example 21 was repeated using styrene-methacrylic acid copolymer 60-40. Essentially the same result was obtained.

EXAMPLE 23

Example 21 was repeated using methyl methacrylate (85%) methacrylic acid (15%) copolymer. Essentially the same result was obtained.

EXAMPLE 24

Example 1 was repeated using 6.35 parts vinyl ethylhexyl ether-maleic anhydride copolymer. The pH increased from 7.3 to 9.8 in 7 days at room temperature and the resulting solution was much less viscous than the original.

EXAMPLE 25

4.6 parts vinyl-isopropyl ether-maleic anhydride copolymer was dissolved in 100 parts water in the absence of alkali but in the presence of 4.4 parts ethylene oxide. The pH increased from 2.0 to 2.3 in the course of 7 days at room temperature, indicating that the reaction rate was very slow under these conditions. The experiment was repeated using 1% aqueous sodium hydroxide solution and under these conditions the condensation took place readily to cause a lowering in viscosity and an increase in pH.

EXAMPLE 26

Example 25 was repeated using 4.25 parts vinyl ethyl ether-maleic anhydride copolymer. Essentially the same result was obtained.

EXAMPLE 27

In order to show that the type of reaction taking place according to the present invention was not due to the initial formation of polymers of ethylene oxide which in turn condensed with the maleic anhydride copolymer, 11 parts polyethylene glycol "200" (a polymer of ethylene oxide having an average molecular weight of 200) was added to 10.1 parts styrene-maleic anhydride copolymer in 250 parts of 1% aqueous sodium hydroxide. There was no change in the solution during standing at room temperature although as can be seen from the following data, the viscosity decreased rather than increased as in Example 1.

|  | Stormer Viscosity (sec.) | Surface Tension dynes/cm$^2$ | pH |
|---|---|---|---|
| Original Solution | 157.5 | 49.5 | 5.4 |
| Mixture | 169.0 | 49.4 | 5.4 |

EXAMPLE 28

Example 1 was repeated using 7.8 parts of epichlorohydrin instead of ethylene oxide. The pH increased from 5.4 to 7.3 in three days and the contents solidified as a white powdery mass.

What is claimed is:

1. The process which comprises dissolving a coplymer consisting essentially of a styrene-maleic anhydride copolymer in a ¼-5% aqueous alkaline solution to obtain a 2-10% concentration of the copolymer, adding a molecular excess of an epoxy compound selected from the class consisting of ethylene oxide, propylene oxide, epoxybutane, epoxybutene, epichlorohydrin, and phenylethylene oxide, and effecting reaction therebetween until no material change occurs in the pH.

2. The process which comprises dissolving a copolymer consisting essentially of a vinyl acetate-maleic anhydride copolymer in a ¼-5% aqueous alkaline solution to obtain a 2-10% concentration of the copolymer, adding a molecular excess of an epoxy compound selected from the class consisting of ethylene oxide, propylene oxide, epoxybutane, epoxybutene, epichlorohydrin, and phenylethylene oxide, and effecting reaction therebetween until no material change occurs in the pH.

3. The process which comprises dissolving a copolymer consisting essentially of a vinyl ethyl ether-maleic anhydride copolymer in a ¼-5% aqueous alkaline solution to obtain a 2-10% concentration of the copolymer, adding a molecular excess of an epoxy compound selected from the class consisting of ethylene oxide, propylene oxide, epoxybutane, epoxybutene, epichlorohydrin, and phenylethylene oxide, and effecting reaction therebetween until no material change occurs in the pH.

4. The process which comprises reacting a molecular excess of an epoxy compound selected from the class consisting of ethylene oxide, propylene oxide, epoxybutane, epoxybutene, epichlorohydrin, and phenylethylene oxide with an aqueous alkaline solution of a synthetic copolymer consisting essentially of maleic anhydride and a vinyl compound copolymerizable therewith.

5. The process which comprises reacting a molecular excess of an epoxy compound selected from the class consisting of ethylene oxide, propylene oxide, epoxybutane, epoxybutene, epichlorohydrin, and phenylethylene oxide with an aqueous alkaline solution of a synthetic copolymer consisting essentially of maleic anhydride and a vinyl compound copolymerizable therewith, at room temperature and pressure.

6. The process which comprises reacting a molecular excess of an epoxy compound selected from the class consisting of ethylene oxide, propylene oxide, epoxybutane, epoxybutene, epichlorohydrin, and phenylethylene oxide with an aqueous alkaline solution of a synthetic copolymer consisting essentially of maleic anhydride and a vinyl compound copolymerizable therewith, at room temperature and pressure for a period of from 2 to 15 days.

7. The process which comprises reacting a molecular excess of an epoxy compound selected from the class consisting of ethylene oxide, propylene oxide, epoxybutane, epoxybutene, epichlorohydrin, and phenylethylene oxide with an aqueous alkaline solution, having an alkali concentration of from ¼ to 5% by weight, of a synthetic copolymer consisting essentially of maleic anhydride and a vinyl compound copolymerizable therewith, the reaction being continued for a period of from 2 to 15 days.

8. The process which comprises dissolving a synthetic copolymer consisting essentially of maleic anhydride and a vinyl compound copolymerizable therewith in an aqueous alkaline solution to obtain a 2 to 10% concentration of the copolymer, adding a molecular excess of an epoxy compound selected from the class consisting of ethylene oxide, propylene oxide, epoxybutane, epoxybutene, epichlorohydrin, and phenylethylene oxide, and effecting reaction therebetween until no material change occurs in the pH of the solution.

9. The process which comprises dissolving a synthetic copolymer consisting essentially of maleic anhydride and a vinyl compound copolymerizable therewith in a ¼ to 5% aqueous alkaline solution to obtain a 2 to 10% concentration of the copolymer, adding a molecular excess of an epoxy compound selected from the class consisting of ethylene oxide, propylene oxide, epoxybutane, epoxybutene, epichlorohydrin, and phenylethylene oxide, and effecting reaction therebetween until no material change occurs in the pH of the solution.

10. The process which comprises dissolving a synthetic copolymer consisting essentially of maleic anhydride and a vinyl compound copolymerizable therewith in a ¼ to 5% aqueous alkaline solution to obtain a 2 to 10% concentration of the copolymer, adding a molecular excess of an epoxy compound selected from the class consisting of ethylene oxide, propylene oxide, epoxybutane, epoxybutene, epichlorohydrin, and phenylethylene oxide to obtain a 2 to 10% concentration of the epoxy compound, and effecting reaction therebetween until no material change occurs in the pH of the solution.

11. The process which comprises dissolving a synthetic copolymer consisting essentially of maleic anhydride and a vinyl compound copolymerizable therewith in an aqueous alkaline solution to obtain a 2 to 10% concentration of the copolymer, adding a molecular excess of ethylene oxide, and effecting reaction therebetween until no material change occurs in the pH of the solution.

12. The process which comprises dissolving a synthetic copolymer consisting essentially of maleic anhydride and a vinyl compound copolymerizable therewith in a ¼ to 5% aqueous alkaline solution to obtain a 2 to 10% concentration of the copolymer, adding a molecular excess of ethylene oxide to obtain a 2 to 10% concentration of the latter, and effecting reaction therebetween until no material change occurs in the pH of the solution.

RAYMOND B. SEYMOUR.

REFERENCES CITED

The following references are of record in the file of this patent:

UNITED STATES PATENTS

| Number | Name | Date |
|---|---|---|
| 1,845,198 | Schmidt et al. | Feb. 16, 1932 |
| 1,864,909 | Jaeger | June 28, 1932 |
| 1,883,182 | Webel | Oct. 18, 1932 |
| 1,971,662 | Schmidt et al. | Aug. 28, 1934 |
| 2,047,398 | Voss et al. | July 14, 1936 |
| 2,056,656 | Ellis | Oct. 6, 1936 |
| 2,063,542 | Ellis | Dec. 8, 1936 |
| 2,131,120 | Schlack | Sept. 27, 1938 |
| 2,324,483 | Castan | July 20, 1943 |
| 2,404,781 | Arnold et al. | July 30, 1946 |
| 2,468,769 | Morris et al. | May 3, 1949 |
| 2,530,983 | Minter | Nov. 21, 1950 |

FOREIGN PATENTS

| Number | Country | Date |
|---|---|---|
| 323,322 | Great Britain | of 1929 |
| 518,057 | Great Britain | Feb. 15, 1940 |
| 881,981 | France | Feb. 8, 1943 |